United States Patent [19]
Babu et al.

[11] Patent Number: 5,401,792
[45] Date of Patent: Mar. 28, 1995

[54] SPRAYABLE THERMOPLASTIC COMPOSITIONS

[75] Inventors: Gaddam N. Babu, Woodbury, Minn.; Dennis D. Hansen, Luck, Wis.

[73] Assignee: Minnesota Mining and Manufacturing Company, St. Paul, Minn.

[21] Appl. No.: 150,594

[22] Filed: Nov. 10, 1993

[51] Int. Cl.6 .............................................. C08L 93/04
[52] U.S. Cl. ..................................... 524/270; 428/200; 428/349; 524/271; 524/272; 525/94
[58] Field of Search ................ 524/271, 272; 525/270, 525/94; 428/200, 349

[56] References Cited

U.S. PATENT DOCUMENTS

| | | |
|---|---|---|
| 3,639,521 | 2/1972 | Hsieh . |
| 4,394,915 | 7/1983 | Nelson |
| 4,497,941 | 2/1985 | Aliani et al. . |
| 4,613,632 | 9/1986 | Aliani et al. . |
| 4,728,683 | 3/1966 | Smits et al. . |
| 4,745,139 | 5/1988 | Haasl et al. |
| 4,822,653 | 4/1989 | Kauffman et al. ................... 428/349 |
| 4,852,754 | 8/1989 | Holdsworth et al. .............. 428/349 |
| 5,024,667 | 6/1991 | Malcolm et al. . |
| 5,026,756 | 6/1991 | Arendt . |
| 5,057,571 | 10/1991 | Malcolm et al. . |
| 5,112,882 | 5/1992 | Babu et al. . |
| 5,149,741 | 9/1992 | Alper et al. ......................... 524/270 |

FOREIGN PATENT DOCUMENTS

| | | |
|---|---|---|
| 442045 | 8/1991 | European Pat. Off. . |
| 451919A2 | 10/1991 | European Pat. Off. . |
| 451920A2 | 10/1991 | European Pat. Off. . |
| Wo 92/05217 | 4/1982 | WIPO. Int'l Appl. |
| 2032439 | 5/1980 | United Kingdom . |

OTHER PUBLICATIONS

S. Chin "High Styrene Copolymers Meet Hot Melt Technology Need," *Adhesives Age*, pp. 26–30 (Jul. 1991).

S. Chin, "New High Styrene Content Isoprene Based Styrenic Block Copolymers" *TAPPI Notes –1991 Hot Melt Symposium*, pp. 43–61.

*Primary Examiner*—Veronica P. Hoke
*Attorney, Agent, or Firm*—Gary L. Griswold; Walter N. Kirn; Robert H. Brink

[57] ABSTRACT

Sprayable hot-melt adhesive compositions are disclosed comprising (A) styrenic block copolymer, (B) tackifying resin, and (C) ethylene copolymer. Methods of preparing and using said compositions are also disclosed.

19 Claims, No Drawings

SPRAYABLE THERMOPLASTIC COMPOSITIONS

BACKGROUND OF THE INVENTION

1. Field of the Invention

This invention relates to thermoplastic compositions and to articles made by adhesively joining components. In particular, this invention relates to sprayable hot-melt adhesive compositions, methods of using said compositions to prepare articles, and to the articles so prepared.

2. Description of Related Art

Hot-melt adhesives are thermoplastic compositions which are solid at room temperature. When heated to liquid or molten form, the hot-melt adhesive can be applied to a substrate. If a second substrate is placed on the hot-melt adhesive before it cools back to a solid, an adhesive bond can be formed joining the two substrates. Hot-melt adhesives typically comprise a polymer, a tackifier, and a wax. See, for example, the descriptions of typical hot-melt adhesives and the function of each component in U.S. Pat. No. 5,026,756 (Arendt).

"Open time" is the time during which the adhesive is applied to a first substrate and remains sufficiently molten to effect a bond between the first substrate and a second substrate. Once the open time has been exceeded, the second substrate cannot be readily bonded to the first substrate. Long open times are generally preferred.

In hot-melt adhesive technology, spray application has been utilized in recent years. The advantages of spray application are described, for example, in European Patent Application 442,045 (Kehr et al.). Spray application generally permits contact-free deposition and ready application to uneven and irregular surfaces. Because spray application also allows for coating of less than the entire surface, spray application can reduce the amount of material used. Spray application is particularly useful where air or moisture permeability is desired. In addition, there may be less risk of thermal damage to substrates than with other application methods.

Kehr et al., supra, states that sprayable hot-melt compositions are generally based on thermoplastic rubber, such as styrenic block copolymers, or ethylene-vinyl acetate ("EVA") copolymers, or amorphous poly(alpha-olefin) copolymers. Kehr et al. goes on to state that each of these sprayable hot-melt compositions has some disadvantages. Compositions comprising thermoplastic rubber are said to be very expensive and to generally contain oil, which is undesirable in many cases. Compositions based on EVA copolymers are said to frequently exhibit an undesirably short open-time. Compositions based on amorphous poly(alpha-olefin) copolymers are said to generally not produce a uniform spray pattern because their rheological properties frequently cause the formation of large droplets on the substrate. These large droplets increase the probability of thermal damage to the substrate. Low molecular weight ("M.W.") poly(alpha-olefin) copolymers are less likely to form large droplets, however, these low M.W. polymers generally do not form acceptable bonds because of either low cohesive-strength or poor adhesive strength whereby an acceptable adhesive bond can usually not be achieved. In addition, Kehr et al. states that commercial amorphous poly(alpha-olefin) copolymers typically need to be sprayed at above 200° C., which may result in damage to temperature-sensitive substrates.

Changes in diaper manufacturing have necessitated the development of new hot melt adhesives. See, for example, European Patent Application 451,920 (Chin). Diaper manufacturers now use thinner gauge polyethylene to manufacture diapers. Not only does thinner gauge polyethylene produce a more aesthetically pleasing diaper but it also represents significant cost savings. However, as the gauge of the polyethylene is decreased, the likelihood of burn through of these thin layers increases. In the past, the lower limit on the operating temperature was defined by the temperature at which the hot melt adhesive could be applied with sufficiently low viscosity for even and proper application. Such temperatures were generally in the range of 149° C. to 177° C. It would be beneficial if hot-melt adhesives could be applied at temperatures of from about 121° C. to about 149° C.

Styrenic block copolymers are widely used to make hot-melt adhesives for a variety of uses including diaper assembly. Hot-melt adhesives based on styrenic block copolymers such as KRATO ™ thermoplastic rubber are said to provide excellent adhesion to non-polar substrates such as polyethylene which are commonly used in diaper manufacture. See, for example, Chin, supra. Additionally, these adhesives are said to maintain adhesion in elasticity demanding applications such as disposable diapers. Relatively low styrene content (from 15% to 24%) styrene-isoprene-styrene block copolymers are said to be useful in adhesives for such applications.

U.S. Pat. No. 4,497,941 (Aliani et al.) discloses wax-free hot-melt compositions comprising tackifier, and EVA copolymer having a melt index of 700 to 10,000. Said EVA copolymers are said to reduce the melt-viscosity in hot-melt systems, thereby replacing the wax of typical hot-melt compositions. See also, U.S. Pat. No. 4,613,632 (Aliani et al.). Said compositions are said to combine a long open time and a short setting time when applied in bead form.

Kehr et al., supra, describes sprayable hot-melt compositions comprising certain largely amorphous poly(alpha-olefin) copolymers. Said compositions are said to have rheology that is better suited for hot-melt spray application than prior art compositions. In contrast to prior art poly(alpha-olefin) copolymers, said compositions are said to have a "critical spray-temperature" below 180° C. Specifically, certain terpolymers comprising interpolymerized units derived from ethylene, 1-butene, and propylene are disclosed.

Certain high-styrene block copolymers are described in S. Chin, "High Styrene Copolymers Meet Hot Melt Technology Needs," *Adhesives Age*, pp 26–30 (July 1991), in S. Chin, "New High Styrene Content Isoprene Based Styrenic Block Copolymers," *TAPPI Notes - 1991 Hot Melt Symposium*, pages 43–61, and in European patent publications 451,919 A2 and 451,920 A2 (S. Chin). Such copolymers are said to exhibit outstanding sprayability compared to current, commercially available, isoprene-based styrenic block copolymers.

U.S. Pat. Nos. 5,057,571 and 5,024,667 (Malcolm et al.) describe hot-melt adhesives comprising a radial block copolymer. Preferred block copolymers comprise polystyrene blocks and polybutylene or polyisoprene blocks.

SUMMARY OF THE INVENTION

Briefly, in one aspect, the present invention provides a sprayable hot-melt composition comprising (A) a styrenic block copolymer whose interpolymerized units comprise from 12 to 45 weight percent of units derived from styrenic monomers; (B) a tackifying resin; and (C) an ethylene copolymer having a melt index sufficiently high to impart good sprayability and desirably long open time to said composition. Melt index ("MI") is determined by ASTM D-1238. The melt index needed depends on the particular ethylene copolymer used. Preferably, the ethylene copolymer is selected from the group consisting of ethylene-vinyl acetate copolymers ("EVA"), ethylene-methyl acrylate copolymers ("EMA"), and ethylene-n-butyl acrylate copolymers ("EnBA"). Preferably, the compositions of this invention further comprise a poly(alpha-olefin) polymer having an inherent viscosity of from 0.2 to 1.4, whose interpolymerized units consist essentially of units derived from alpha-olefins of 4–18 carbon atoms.

In another aspect, the present invention provides a method for making articles.

In another aspect, the present invention provides articles comprising the composition of this invention.

For the purposes of this specification, "phr" means parts by weight per hundred parts of the styrenic block copolymer and ethylene copolymer.

DETAILED DESCRIPTION

The styrene copolymers useful in this invention are styrenic block copolymers based on butadiene or isoprene. Such polymers are described for example in U.S. Pat. No. 5,057,571, supra, and in the S. Chin articles, supra.

The preferred block copolymers have the general linear formula A—B—A, or the general radial formula

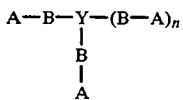

wherein n is 1–3, and where A and B represent polymer blocks. The A block comprises polymerized styrene and the B block comprises polymerized butadiene, isoprene, or mixtures thereof and can be hydrogenated. Y is a polyfunctional moiety derived from, for example, polyfunctional coupling agents typically used in the manufacture of the radial block copolymers. Such coupling agents and the preparations of the rubbery copolymers useful in the adhesive compositions of the invention are described in detail in a variety of patents including U.S. Pat. No. 3,639,521 (Hsieh) and others.

Preferred radial block copolymers contain 15 to 45 weight percent, most preferably 25 to 35 weight percent of interpolymerized units derived from styrene. The average molecular weight of the preferred radical block copolymers is at least about 140,000, most preferably greater than about 160,000.

Particularly preferred radial block copolymers are those described in European Patent Pub. 451,920, supra. These copolymers are isoprene and styrene-based copolymers wherein the polystyrene block molecular weight is greater than 12,000 and the polystyrene content is 35 percent by weight or less based on total weight of the copolymer.

Preferred linear block copolymers have a molecular weight in the range of about 70,000–145,000 and have from about 12 to 35 weight percent styrene. Such linear copolymers are available from Shell Chemical Company, Enichem, Fina, and Firestone.

Particularly preferred linear block copolymers are the linear styrene-isoprene-styrene block copolymers described in European Pat. Pub. 451,919, supra. These copolymers are characterized in that the polystyrene block molecular weight ranges from 14,000 to 16,000. The polystyrene content ranges from 25% to 35% by weight of the block copolymer composition and the average molecular weight of the linear block copolymer composition ranges from 80,000 to 145,000 and preferably from 100,000 to 145,000.

Preferred ethylene copolymers useful in this invention are copolymers of ethylene and vinyl acetate, methyl acrylate, n-butyl acrylate, or combinations thereof.

In the case of an EVA copolymer, it is preferred that the copolymer have a melt index of at least 150 (preferably at least 500) and from 14% to 35% (preferably from 23% to 30%) vinyl acetate. Ethylene-vinyl acetate (EVA) copolymers of high melt-index are described, for example, in U.S. Pat. No. 4,728,683 (Smits et al.), which description is hereby incorporated by reference. These EVA copolymers have a vinyl acetate content of from 10 to 30 percent by weight based on weight of the copolymers. No disadvantage has been encountered at higher melt indices although it becomes more difficult and expensive to make an EVA copolymer that has a melt index above about 2500.

To provide the longest open times, the vinyl acetate ("VA") content of the EVA copolymer should be from 23 to 30 weight percent. Furthermore, when the vinyl acetate content is substantially less than 23%, the adhesive may be less tacky when sprayed in a thin layer. When the vinyl acetate content is substantially greater than 30%, thin layers may be tacky without being aggressively so, and/or the compositions may be too soft and amorphous and may lose their capacity to form strong, creep-resistant bonds.

The EMA copolymer preferably has a melt index of at least 70. If the melt index is less than about 70, hot-melt compositions made therefrom may be too viscous to be readily sprayed onto a substrate (using conventional hot-melt composition dispensers) at application temperatures of about 127° C. (260° F.) or less. It is believed that there is no effective upper limit on the melt index of EMA copolymers which may be used according to the invention, although the use of higher melt index copolymers may be practically limited by factors such as cost and commercial availability.

The methyl acrylate ("MA") content of the EMA copolymer should be less than 35%, more preferably less than 25%, and most preferably from about 21% to 23%. At a MA content in the range of about 25% to 35%, the compositions may be too soft and amorphous and may lose their capacity to form strong, creep-resistant bonds. However, if the MA content is substantially less than about 21%, the hot-melt compositions may not be sufficiently tacky (i.e., the open time becomes too short) when sprayed in a thin layer.

The EnBA copolymer preferably has a melt index of at least 150, more preferably at least 750, and from 25% to 40% (more preferably from 30% to 38%) n-butyl acrylate. If the melt index is less than 150, hot-melt compositions made therefrom may be too viscous to be readily sprayed onto a substrate (using conventional hot-melt composition dispensers) at application temperatures of about 127° C. (260° F.) or less. It is believed that there is no effective upper limit on the melt index of EnBA copolymers which may be used according to the invention, although the use of higher melt index copolymers may be practically limited by factors such as cost and commercial availability.

The n-butyl acrylate ("BA") content of the EnBA copolymer should be from about 25% to 40%, more preferably from about 30% to 38%. At a BA content substantially greater than about 40%, the compositions may be too soft and amorphous and may lose their capacity to form strong, creep-resistant bonds. However, if the BA content is substantially less than about 25%, the hot-melt compositions may not be sufficiently tacky (i.e., the open time becomes too short) when sprayed in a thin layer.

Each of the EMA, EVA and EnBA copolymers may include small amounts of other materials such as stabilizers, antioxidants, melt-index modifiers (e.g., isobutylene and propylene), and various reactive monomers such as acrylic acid, methacrylic acid, and maleic anhydride which may be useful in modifying the physical properties of the copolymers. Preferably, these "other materials" comprise less than 10 percent by weight of the total copolymer(s).

The tackifying resins useful in this invention are those which are compatible with the styrenic block copolymer used in the hot-melt composition. A broad range of tackifying resins commonly used in the adhesives industry with styrenic block copolymers will be useful in this invention. Examples of tackifying resins useful in the adhesives of the invention are rosin derivatives including wood rosin, tall oil, tall oil derivatives, cyclopentadiene derivatives as described, for example, in UK patent application GB 2,032,439A (Shozo et al.), rosin ester resins, natural and synthetic terpenes, terpene-phenolics, and aliphatic or mixed aliphatic-aromatic tackifying resins.

Rosin is a solid material that occurs naturally in the oleo rosin of pine trees and typically is derived from the oleo resinous exudate of the living tree, from aged stumps and from tall oil produced as a by-product of kraft paper manufacture. After it is obtained rosin can be treated by hydrogenation, dehydrogenation, polymerization, esterification, and other post treatment processes. Rosin is typically classed as a gum rosin, a wood rosin, or as a tall oil rosin which indicate its source. The materials can be used unmodified, in the form of esters of polyhydric alcohols, and can be polymerized through the inherent unsaturation of the molecules. These materials are commercially available and can be blended into the adhesive compositions using standard blending techniques. Representative examples of such rosin derivatives include pentaerythritol esters of tall oil, gum rosin, wood rosin, or mixtures thereof.

Preferred resins include hydrogenated synthetic $C_9$ resins, synthetic branched and unbranched $C_5$ resins, hydrogenated $C_5$ and $C_9$ resins, cyclopentadienes, and mixtures thereof.

The amount of tackifying resin employed is preferably from 20 to 300 parts by weight per hundred parts styrenic block copolymer and ethylene copolymer ("phr"), more preferably from 100 to 200 phr, most preferably from 100 to 150 phr.

The selection of the particular tackifying agent is, in large part, dependent upon the specific styrenic block copolymer and ethylene copolymer employed in the respective adhesive composition. In the manufacture of disposable articles such as diapers, sanitary napkins and bed pads, there is the additional consideration of having a substantially white or clear adhesive composition.

The preferred poly(alpha-olefin) polymers useful in this invention are poly(alpha-olefin) homopolymers, copolymers, terpolymers, tetramers, or combinations thereof derived from monomers containing from 4 to 18, most preferably from 6 to 10, carbon atoms. See, for example, the poly(alpha-olefin) polymers described in U.S. Pat. No. 5,112,882 (Babu et al.), which descriptions are hereby incorporated by reference.

The hot-melt adhesive composition of the instant invention may contain plasticizers, or compounding oils, or liquid or solid resins. Rubber compounding oils are well-known in the art and include both high saturates content oils and high aromatics content oils.

Optional components of the present invention are stabilizers which inhibit or retard heat degradation, oxidation, skin formation and color formation. Stabilizers are typically added to the commercially available compounds in order to protect the compositions against heat degradation and oxidation during the preparation, use, and high-temperature storage of the adhesive composition.

Additional stabilizers known in the art may also be incorporated into the adhesive composition. These may be for protection during the life of the disposable article against, for example, oxygen, ozone and ultraviolet radiation.

The adhesive compositions of the present invention can be prepared by blending the components at an elevated temperature, preferably between 130° C. and 200° C., until a homogeneous blend is obtained, usually less than three (3) hours. Various methods of blending are known to the art and any method that produces a homogeneous blend is satisfactory.

The resultant adhesives may then be used in a wide variety of product assembly applications. A particularly preferred application is their use in bonding lightweight materials such as polyethylene or polypropylene substrates to paper, fabric, tissue, non-wovens, polyethylene or polypropylene substrates, or to themselves. An additional advantage of the adhesive of the present invention is that it can be effectively applied by spraying.

EXAMPLES

In the following Examples and Comparative Examples, components of the composition were combined in an open can, heated under a Nitrogen atmosphere to about 177° C., and mixed with an air mixer until a homogeneous molten was obtained. The molten material was poured into a 0.3785 liter aluminum metal cartridge for use in a PAM 500E Spraymatic spray gun (Power Adhesive Machines, Inc.).

In the following non-limiting examples, all parts are by weight unless otherwise specified.

Sprayability

Compositions were sprayed from a PAM 500 E Spraymatic spray gun at a gun thermometer temperature of about 177° C. at a distance of about 15 cm from a 41 cm high by 38 cm diameter drum rotating at 8 RPM on which a 25.4 cm by 61 cm piece of foil-laminated paper was attached. The setting which governs the pressure placed on the back of the aluminum cartridge was set at $2\times10^5$ N/m$^2$ (2 Bar) or at $5\times10^5$ N/m$^2$ (5 Bar). The setting which governs the air flow to the spray tip was set at 0 for maximum air flow on the spray gun. The covered paper resulting from the spraying was removed from the drum and a 10 cm strip was cut from the middle of the paper. The spray width was determined by measuring the width within which 95% of the major dimension occurs. Good sprayability is shown by a spray width of about 2.5 cm or greater.

Open Time

Compositions were sprayed, onto a foil laminated paper, as in the Sprayability test method described above, using the $2\times10^5$ N/m$^2$ (2 Bar) setting. Immediately after spraying onto the foil paper, a 2.54 cm strip was cut from the middle of the paper and, after waiting a selected time, the strip was bonded to a piece of standard white bond typing paper, using one pass of a 4.5 kg Fischer roller. After 60 seconds, the bond was peeled apart by hand and any paper delamination was noted. The Open Time was determined as the longest time after application of the sprayed composition that a bond can be made that results in at least 80% paper delamination.

Heat Resistance

Compositions were extruded onto a clean, dry, 2.54 cm by 10 cm by 0.64 cm piece of fir. A PAM 500 E spray gun was used. The setting which governs the pressure on the back of the aluminum cartridge was set at $2\times10^5$ N/m$^2$ (2 Bar). The setting which governs the air flow to the spray tip was set at 10 for minimum air flow. Using 13 mm copper wire to control bondline thickness, a second clean, dry piece of fir was overlapped with the first to form a 2.54 cm by 2.54 cm square overlap area. The bonded samples were allowed to age at room temperature for a minimum of 24 hours after which one end of the sample was secured in an air circulating oven set at 38° C. (100° F.) and a 0.9 kg weight was suspended from the other end. The temperature was raised 5.5° C. (10° F.) every 30 minutes until failure occurred. The last temperature at which the bonded sample did not fail was determined to be the Heat Resistance. The value reported was the average of three replicates. A preferred heat resistance is at least 38° C. (100° F.).

Flow Rate

Compositions were extruded for 15 seconds into a previously weighed cup. A PAM 500 E spray gun was used. The setting which governs the pressure placed on the back of the aluminum cartridge was set at $5\times10^5$ N/m$^2$ (5 Bar). The setting which governs the air flow to the spray tip was set at 10 for minimum air flow. After extruding the cup was weighed again and the difference between the empty cup and the cup containing extruded material multiplied by 4 was reported as the Flow Rate in grams per minute.

EXAMPLES 1–6 AND COMPARATIVE EXAMPLES C1 AND C2

In Examples 1–6 and Comparative Examples C1 and C2, the parts by weight of styrenic block copolymer to ethylene copolymer was varied. Each Example and Comparative Example contained 62.5 parts by weight of Piccolyte TM HM-90, aromatic modified terpene resin, 90° C. nominal softening point, available from Hercules, Inc., Wilmington, Del. The compositions were prepared as described above, and were tested for Open Time, Sprayability (as shown by spray width), and Heat Resistance as described above. The components, amounts (parts by weight), and test results are summarized in Table 1.

TABLE 1

| Components | EXAMPLES | | | | | | | | |
|---|---|---|---|---|---|---|---|---|---|
|  | C1 | 1 | 2 | 3 | 4 | 5 | 6 | 7 | C2 |
| KRATON RP 6404[1] | 0 | 10 | 15 | 20 | 25 | 30 | 35 | 40 | 50 |
| EP 4969-6W[2] | 50 | 40 | 35 | 30 | 25 | 20 | 15 | 10 | 0 |
| Open Time (sec) | <5 | 10 | 30 | 40 | 60 | 70 | 20 | 10 | <5 |
| Spray Width (cm) | | | | | | | | | |
| @ $5\times10^5$ N/m$^2$ | 10.16 | 5.72 | 5.72 | 5.72 | 5.08 | 4.45 | 3.18 | 3.18 | 3.18 |
| @ $2\times10^5$ N/m$^2$ | 4.45 | 3.18 | 3.18 | 3.18 | 2.54 | 2.54 | 2.22 | 2.22 | 2.22 |
| Heat Resistance (°C.) | 49 | 49 | 49 | 49 | 49 | 49 | 54.5 | 60 | 60 |

[1]Radial Styrene-Isoprene-Styrene block copolymer, 30% styrene, available from Shell Chemical Co., Houston, TX.
[2]EVA, 28% VA, MI 1000, available from E.I. DuPont de Nemours, Wilmington, DE.

The data in Table 1 show that Examples containing both a styrenic block copolymer and an ethylene copolymer can have both a longer open time and greater spray width than Comparative Examples containing the styrenic block copolymer alone (Comparative Example C2) or the ethylene copolymer alone (Comparative Example C1).

The compositions of Example 3 and Comparative Example C2 were evaluated by varying the exit temperature to determine its effect on spray properties. A thermocouple was positioned in the exiting molten material from a PAM 500 E spray gun with the setting which governs the pressure on the back of the aluminum cartridge set at $5\times10^5$ N/m$^2$ (5 Bar), and air flow to the spray tip was set at 10 for minimum air flow. The exit temperatures and the test results for Spray Width (sprayability) and Flow Rate (test methods described hereinabove) are shown in Table 2.

TABLE 2

| Exit Temperature | Example 3 | | Comparative Example C2 | |
|---|---|---|---|---|
|  | Spray Width | Flow Rate | Spray Width | Flow Rate |
| 129.5° C. | 2.86 cm | 14 g/minute | Could not spray | |
| 138° C. | Not tested | | 1.91 cm | 6 g/minute |

TABLE 2-continued

| | Example 3 | | Comparative Example C2 | |
|---|---|---|---|---|
| Exit Temperature | Spray Width | Flow Rate | Spray Width | Flow Rate |
| 160° C. | 5.08 cm | 22 g/minute | 3.49 cm | 14 g/minute |

This data in Table 2 show that a composition with both styrenic block copolymer thermoplastic elastomer and ethylene copolymer can be sprayed at a lower exit temperature than a composition without the ethylene copolymer, while maintaining a desirable spray width.

EXAMPLES 8–14

In Examples 8–14, the amount of tackifying resin was varied. Each Example contained 20 parts by weight of the styrenic block copolymer used in Example 1 and 30 parts by weight of the EVA used in Example 1. The compositions were prepared as described above, and tested for Open Time, spray width (Sprayability), and Heat Resistance as described above. The components, amounts (parts by weight), and test results are summarized in Table 3.

TABLE 3

| | EXAMPLES | | | | | | |
|---|---|---|---|---|---|---|---|
| | 8 | 9 | 10 | 11 | 12 | 13 | 14 |
| PICCOLYTE HM-90 | 25 | 50 | 62.5 | 75 | 100 | 125 | 150 |
| Open Time (sec) | <5 | 10 | 40 | 60 | <5 | <5 | <5 |
| Spray Width (cm) | | | | | | | |
| @ 5 × 10⁵ N/m² | 1.91 | 5.08 | 5.72 | 6.35 | 5.72 | 5.72 | 5.72 |
| @ 2 × 10⁵ N/m² | <1 | 2.86 | 3.18 | 3.18 | 3.18 | 3.18 | 3.18 |
| Heat Resistance (°C.) | 49 | 49 | 49 | 43.5 | 43.5 | 43.5 | 43.5 |

The data in Table 3 show that preferred tackifying resin level in these compositions is from 50 to 200 phr, most preferably from about 100 to about 125 phr.

EXAMPLES 15–20

In Examples 15–20, polymers derived from alpha-olefins were added. The compositions were prepared as described above, and tested for spray width (Sprayability), Open Time, and Heat Resistance as described above. Each Example contained 62.5 parts by weight of Piccolyte HM-90 ™ tackifying resin. The components, amounts (parts by weight), and test results are summarized in Table 4.

TABLE 4

| | EXAMPLES | | | | | |
|---|---|---|---|---|---|---|
| | 15 | 16 | 17 | 18 | 19 | 20 |
| KRATON RP 6404 | 18 | 18 | 18 | 18 | 16 | 14 |
| EP 4969 -6W | 27 | 27 | 27 | 27 | 24 | 21 |
| Polyhexane¹ (IV 0.2) | 5 | | | | | |
| Polyhexane¹ (IV 0.8) | | 5 | | | | |
| Polyhexane¹ (IV 1.6) | | | 5 | | | |
| Polyoctene² (IV 0.8) | | | | 5 | 10 | 15 |
| Open Time (sec) | 50 | 50 | 60 | 80 | 100 | 130 |
| Spray Width (cm) | | | | | | |
| @ 5 × 10⁵ N/m² | 7.62 | 5.08 | 5.08 | 5.72 | 4.45 | 3.49 |
| @ 2 × 10⁵ N/m² | 3.18 | 2.86 | 2.86 | 3.18 | 3.18 | 2.54 |
| Heat Resistance (°C.) | 43.5 | 49 | 43.5 | 43.5 | 43.5 | 43.5 |

¹Prepared as described in U.S. Pat. No. 5,112,882 (Babu et al.).
²Available from Eastman Chemicals Co., Kingsport, TN, as homopolymer TY 1872-88.

The data in Table 4 show that with the addition of polyhexene, compositions have extended bonding ranges, and that spray widths decrease with increasing amount of polyoctene.

EXAMPLES 21–23

In Examples 21–23, the tackifying resin level was varied in compositions containing the polyoctene of Examples 18–20. Each Example contained 18 parts by weight of the styrenic block copolymer used in Example 1, 27 parts by weight of the EVA used in Example 1, and 5 parts by weight of the polyoctene of Examples 18–20 (IV of 0.8). The compositions were prepared as described above, and tested for Open Time, spray width (Sprayability), and Heat Resistance as described above. The components, amounts (parts by weight), and test results are summarized in Table 5.

TABLE 5

| | EXAMPLES | | |
|---|---|---|---|
| | 21 | 22 | 23 |
| Piccolyte HM-90 | 50 | 62.5 | 75 |
| Open Time (sec) | 30 | 80 | 180 |
| Spray Width (cm) | | | |
| @ 5 × 10⁵ N/m² | 5.08 | 5.72 | 6.35 |
| @ 2 × 10⁵ N/m² | 2.86 | 3.18 | 3.18 |
| Heat Resistance (°C.) | 43.5 | 43.5 | 38 |

The data in Table 5 show that increasing the amount of tackifying resin increases the open time but may decrease heat resistance.

EXAMPLES 24–25

In Examples 24 and 25 the ethylene copolymer was varied. Each Example contained 20 parts by weight of the styrenic block copolymer used in Example 1 and 62.5 parts by weight of the tackifying resin used in Example 1. The compositions were prepared and tested for spray width (Sprayability), Open Time, and Heat Resistance as described above. The components, amounts (parts by weight), and test results are summarized in Table 6.

TABLE 6

| | EXAMPLES | |
|---|---|---|
| | 24 | 25 |
| Exxon LDX 326¹ | 30 | — |
| Quantum 89822² | — | 30 |
| Open Time (sec) | 30 | 80 |
| Spray Width (cm) | | |
| @ 5 × 10⁵ N/m² | 3.81 | 3.81 |
| @ 2 × 10⁵ N/m² | 1.91 | 2.54 |
| Heat Resistance (°C.) | 49 | 43.5 |

¹Ethylene Methyl Acrylate, 24% Methyl Acrylate, MI 286, available from Exxon Chemicals.
²Ethylene n-Butyl Acrylate, 35% n-Butyl Acrylate, MI 400, available from Quantum Chemicals.

The data in Table 6 show that a composition containing an EMA having a MI of 286 and a composition containing an EnBA having a MI of 400 had increased Open Time while maintaining good sprayability.

Various modifications and alterations of this invention will become apparent to those skilled in the art without departing from the scope or spirit of this invention.

What is claimed is:

1. A sprayable hot-melt adhesive composition comprising (A) styrenic block copolymer whose interpolymerized units comprise from 12 to 45 weight percent of units derived from styrenic monomers; (B) tackifying resin; and (C) ethylene copolymer having a melt index sufficiently high to impart good sprayability and desirably long open time to said composition.

2. The composition of claim 1 wherein said block copolymer is a block copolymer whose interpolymerized units comprise from 25 to 35 weight percent of units derived from styrenic monomers.

3. The composition of claim 2 wherein said block copolymer is a linear block copolymer having an average molecular weight of from 80,000 to 145,000.

4. The composition of claim 2 wherein said block copolymer is a radial block copolymer having an average molecular weight of at least 140,000.

5. The composition of claim 1 wherein said ethylene copolymer is selected from the group consisting of ethylene-vinyl acetate copolymers, ethylene-methyl acrylate copolymers, and ethylene-n-butyl acrylate copolymers.

6. The composition of claim 1 wherein said ethylene copolymer is selected from the group consisting of ethylene-vinyl acetate copolymers having a melt index of at least 150, ethylene-methyl acrylate copolymers having a melt index of at least 70, and ethylene-n-butyl acrylate copolymers having a melt index of at least 150.

7. The composition of claim 1 wherein said block copolymer comprises blocks whose interpolymerized units are derived from isoprene, butadiene, or combinations thereof.

8. The composition of claim 1 wherein said tackifying resin is present in said adhesive composition as 20 to 300 parts by weight per 100 parts by weight of said block copolymer and said ethylene copolymer.

9. The composition of claim 1 wherein said ethylene copolymer is present in an amount sufficient to improve the sprayability of the composition compared to compositions without said ethylene copolymer.

10. The compositions of claim 9 wherein said ethylene copolymer is present as 25 to 400 parts by weight per 100 parts by weight of said block copolymer.

11. The composition of claim 1 wherein said composition is sprayable at temperatures below 149° C. (300° F.).

12. The composition of claim 1 further comprising a polymer having an inherent viscosity of 0.2 to 1.4 whose interpolymerized units consist essentially of units derives from alpha-olefins containing from 4 to 18 carbon atoms.

13. The composition of claim 12 wherein said alpha olefins are selected from the group consisting of 1-octene and 1-hexene.

14. An article comprising a first and second substrate, wherein said substrates are bonded together with a sprayable hot-melt adhesive composition comprising a styrenic block copolymer whose interpolymerized units comprise from 12 to 45 weight percent of units derived from styrenic monomers, a tackifying resin, and an ethylene copolymer having a melt index sufficiently high to impart good sprayability and desirably long open times to said composition.

15. The article of claim 14 wherein at least one of said substrates comprises polyethylene or polypropylene.

16. The article of claim 14 wherein said hot-melt composition further comprises a polymer having an inherent viscosity of 0.2 to 1.4 whose interpolymerized units consist essentially of units derived from alpha-olefins containing from 4 to 18 carbon atoms.

17. A method for preparing an article comprising the steps of
(A) preparing a sprayable hot-melt adhesive composition comprising a styrenic block copolymer whose interpolymerized units comprise from 12 to 45 weight percent of units derived from styrenic monomers, a tackifying resin, and an ethylene copolymer having a melt index sufficiently high to impart good sprayability and desirably long open times to said composition,
(B) spraying said adhesive composition onto a first substrate to form an adhesive layer, and
(C) applying a second substrate to said adhesive layer such that a bond is formed between said first and second layers.

18. The method of claim 17 wherein at least one of said substrates comprises polyethylene or polypropylene.

19. The method of claim 17 wherein said hot-melt adhesive composition further comprises a polymer having an inherent viscosity of 0.2 to 1.4 whose interpolymerized units consist essentially of units derived from alpha-olefins containing from 4 to 18 carbon atoms.

* * * * *

UNITED STATES PATENT AND TRADEMARK OFFICE
CERTIFICATE OF CORRECTION

PATENT NO.   : 5,401,792
DATED        : March 28, 1995
INVENTOR(S)  : Gaddam N. Babu and Dennis D. Hansen It is certified that error appears in the above-indentified patent and that said Letters Patent is hereby corrected as shown below:

Col. 2, line 24, "KRATOTM" should read --KRATON™--.

Col. 5, line 31, delete "." between block and copoly-, should read --block copoly- --.

Signed and Sealed this

Sixth Day of June, 1995

*Attest:*

BRUCE LEHMAN

*Attesting Officer*       *Commissioner of Patents and Trademarks*